United States Patent

[11] 3,601,800

[72] Inventor Hua-Tung Lee
Poughkeepsie, N.Y.
[21] Appl. No. 862,206
[22] Filed Sept. 30, 1969
[45] Patented Aug. 24, 1971
[73] Assignee International Business Machines Corporation
Armonk, N.J.

[54] ERROR CORRECTING CODE DEVICE FOR PARALLEL-SERIAL TRANSMISSIONS
13 Claims, 8 Drawing Figs.

[52] U.S. Cl. .......... 340/146.1
[51] Int. Cl. .......... G08c 25/00, H04l 1/10
[50] Field of Search .......... 340/146.1

[56] References Cited

UNITED STATES PATENTS 3,114,130 12/1963 Abramson .......... 340/146.1
3,162,837 12/1964 Meggitt .......... 340/146.1
3,209,327 9/1965 Brandt .......... 340/146.1
3,237,160 2/1966 Mitchell .......... 340/146.1

*Primary Examiner*—Malcolm A. Morrison
*Assistant Examiner*—R. Stephen Dildine, Jr.
*Attorneys*—Hanifin and Jancin and Robert Lieber

ABSTRACT: Data signals are encoded in an $(n,k)$ cyclic code and checked for errors and corrected. The encoding and correction decoding apparatus includes an $n-k$ stage parallel input parallel feedback shift register adapted to process the data digit signals in groups of $c$ digits where the number $c$ is greater than $n-k$. An example of implementation is disclosed for the specific case: $n=72$, $k=64$, and $c=18$, illustrating that encoding and/or error check decoding are completed in only 4 $(=n/c)$ parallel shifts and that error correction decoding is accomplished in a maximum of only 3 additional parallel shifts timed to coincide with the handling of the data signals.

INVENTOR
HUA - TUNG LEE
BY [signature]
ATTORNEY

ERROR CORRECTING CODE DEVICE FOR PARALLEL-SERIAL TRANSMISSIONS

BACKGROUND OF THE INVENTION

1. Field of Invention

The invention pertains to data handling and transmission systems and particularly to such systems employing feedback shift registers and cyclic coding of information to accomplish error detection and correction.

2. Description of the Prior Art

Error checking and correcting devices with feedback shift circuits are treated extensively in U.S. Pat. Ser. Nos. 3,162,837 issued to Meggitt on Dec. 22, 1964, and 3,452,328 issued to Hsiao et al. on June 24, 1969. Both patents are assigned to the assignee of this application.

Meggitt shows circuit designs for serial-input parallel-feedback shifting and for serial decoding of errors which may be adapted to operate in coordination with serial process handling of data signals. Error correction decoding is accomplished in part by continued serial shifting of the shifting circuit after development of an error check residue therein.

Hsiao et al. disclose parallel-input parallel-feedback shift circuits, particularly circuits with $n-K$ shift stages, designed to provide checking and correction of data signals encoded in $(n,k)$ cyclic codes in shift sequences which are short in comparison to Meggitt's operations. Hsiao et al. describe specific circuits for handling parallel data signal inputs of up to $n-k$ data signals. However, the extension of the patent teachings to accomplish parallel input handling of more than $n-k$ data signals, and the need and usefulness of such, are by no means apparent.

Accordingly I have recognized such a need which I describe herein and I have invented parallel shift transformation logic for efficiently handling parallel shifting of more than $n-k$ data signals according to a cyclic code algorithm with an $n-k$ stage feedback shift register. As I show herein such shifting is particularly effective for checking the data signals when the signals are subject to real time handling in parallel units of more than $n-k$ signal elements. With my features of construction the timing of the checking and error correction functions can be more closely matched to the timing of the checked code signals with but slight increase in hardware expense. As I show further herein by combining the highly parallel shift features just mentioned with parallel extensions of serial error site decoding principles first considered by Meggitt the time required to accomplish error correction can be significantly reduced.

SUMMARY OF THE INVENTION

Presented here is a parallel-input, parallel-feedback shifting circuit of unique construction which is suited for being used to check for errors in data signals which are encoded in an $(n,k)$ cyclic code particularly when such signals otherwise require real time process handling in parallel groups of more than $n-k$ but less than $n$ code element signals. The same apparatus is also used to encode raw data signals in $k$ element groups.

The device is distinguished by its capability of developing check bits and/or error check indications in fewer parallel shift operations than devices constructed according to the specific teachings of the earlier Hsiao et al. patent discussed above. Thus the invention provides an economical, reliable and convenient basis for gaining small but significant operating time advantages relative to the Hsiao et al. type of apparatus, by adding a moderate increment of shift logic, when the checked signals are subject otherwise to real time handling in parallel units of more than $n-k$ signal elements as described herein.

The device and the system into which it is most effectively incorporated are distinguished in a general sense in that the $n$-digit signals representing words encoded in the said $(n,k)$ code are otherwise subject to real time handling for normal processing usage in parallel signal units of $c$ digit signals $(n>c>n-k)$. Thus, when $c$ is a submultiple of $n$ the encoding and error checking functions can each be completed in only $(n/c)$ parallel shift cycles as compared to $(n/n-k)$ or more cycles in apparatus specifically described by Hsiao et al.

The subject device has another interesting advantage of being able to complete the pattern decoding operation of error site identification, elsewhere herein referred to as syndrome detection or decoding, in at most $(n/c)-1$ additional parallel feedback shifts of the check residue code obtained at conclusion of the error checking stage of parallel-input parallel-feedback shifting, rather than the larger figure of $(n/n-k)-1$ additional shifts suggested by adhering strictly to the combined teachings of the Meggitt and Hsiao et al. patents.

As a feature of my invention, I provide an $n-k$ stage parallel-input parallel-feedback register with parallel inputs derived through $n-k$ respective modulo two adder networks. The latter networks have unique logical organization and construction. This register is used to encode raw data into $(n,k)$ code words and to check and correct such coded data. Said adder networks are designed, for encoding and checking usage, to receive directly respective different subcombinations of the $c$ parallel occurring signals representing the input signals to be encoded and/or checked in conjunction with respective different subcombinations of the stage outputs of the register.

The adder outputs are transferred directly to the register stage inputs in time coordination with the receipt of the data signals. Apparatus constructed according to my teaching completes either the encoding or the error checking operation for a word in only $(n/c)$ parallel-input parallel-feedback shift operations of the register, when $c$ is a submultiple of $n$.

The states of the register during parallel-input shifting represent cumulative partial residues of a polynomial division process in which a polynomial whose coefficients are given by the digits of the input data signal is divided by a generating polynomial of degree $n-k$ with predetermined coefficients. The final residue represents either the check digits of a newly encoded word or the error check status of a received code word signal. In the error checking process, the final residue is arranged to assume a condition other than zeros in all $n-k$ register positions only when error has occurred either in the received code word signal or in the operation of the circuits of the checking system.

The same register and modulo two adder networks are designed for continued cumulative parallel-feedback shifting without further input of data signals when a final nonzero check residue is obtained. This continued shift facility is used to locate sites of errors for correction.

As a more specific feature of my invention, I provide $c$ parallel decoding circuits with connection to receive and react in parallel to $c$ predetermined different combinations of the $2(n-ka)$ true and complement state outputs of the stages of the register during the continued shift sequence following detection of error. Outputs from these decoding circuits uniquely identify sites of error within specific $c$-digit subgroups of the $n$-digit signal constituting a checked data word signal. This error site identification function is completed in a maximum of only $(n/c)-1$ continued cumulative parallel-feedback shifts of the final check residue.

Another interesting aspect of invention is the disclosed incorporation of parallel-input parallel-feedback encoding/error checking/error correcting apparatus, as just characterized, into a real time data handling system in which data signals are handled in units of $c$ parallel signal elements. Thus in a specific example I teach how to incorporate my device into the input/output (I/O) facility of a data processing system. The data words in this system are encoded in a (72,64) cyclic code and are handled between the channel section of the central data processing system and the peripheral devices in 18-bit parallel signal units. The latter units constitute syllable or quarter-word segments of the associated 72-bit code words. In this application of my device I provide an $n-k=8$ stage parallel-input parallel-feedback shift register. However, I have adapted the logic for developing the register stage inputs so that the bits of each 18-bit code word syllable are handled simultaneously both for checking and for error correction.

I teach how to use my device for the dual purpose of encoding signals outbound to the peripherals and of decoding cyclically encoded signals inbound from the peripherals. In the decoding process the device is adapted to recognize error as a nonzero condition of the 8-stage register at completion of shifting with parallel input and parallel feedback. When error is detected, the device is conditioned to recognize further 18 unique state conditions specifically indicative of error sites within the input word associated with the nonzero check residue. The device is shifted with only feedback connections active until site recognition occurs.

I show that the 18-bit syllable containing the error is in one-to-one correspondence with the phase of the continued residue shifting and the bit in error within each syllable is associated with the recognized state condition. Thus when an error site indicating state is recognized in the unshifted check residue, it is associated with the first-transferred syllable of the checked word. If error site recognition occurs after one feedback shift of the check residue the site of error is localized to the second-transferred syllable, and so forth. Hence at most three continued feedback shifts of the check residue will provide indication of either an error site within the associated word or of the uncorrectable nature of the error.

An important aspect of the invention is the computational method used to calculate the unique modulo two summing connections for the $c+n-k$ to $n-k$ vector transformation by which successive parallel inputs to the shift register are produced during encoding and checking. In this method the sequence of autonomously generated residue states of a corresponding serial-input parallel-feedback shifter are calculated, either by hand or by programmed computer, assuming an initial state 1,0,0,...,0 (first shifter position in 1 state, all other positions in 0 states). If the calculated states are written down in a matrix listing, the columns of the first $c$ rows of such a list are useful to determine the groupings of subcombinations of the $c$-syllable input signals for modulo-two addition. It is shown that the next $n-k$ row (state) vectors in the same list are useful to determine groupings of subcombinations of the register stage outputs for feedback modulo-two summation in association with the input signal subcombinations.

Another significant aspect is that for single error correction/double error detection codes the parity of the check residue in the shift device can be used to distinguish between single and double error conditions immediately upon reception of the last ($n$th/$c$) syllable of a code word. It is observed that the odd/even parity of the final check residue in the register at completion of the ($n$th/$c$) parallel-input parallel-feedback shift corresponds in these code systems with respective occurrences of an odd or even number of errors in the received code word.

Yet another aspect of the invention relates to its use in a shortened cyclic code system. Such systems are treated generally in "Error Correcting Codes" by W. W. Peterson (note pages 158 to 160) published by The MIT Press in 1961. I have observed that when $n$ denotes the length of $(n,k)$ words in a shortened cyclic code system, and consequently is less than one of the quantities $2^{n1k}-1$ or $2^{n1k11}-1$ depending respectively upon whether the code is designed for single error correction only or for both single error correction and double error detection, the $(n-c+1($th to $n$th rows of the autonomous matrix listing correspond to residue indicators of error position which are available at an early stage of feedback shifting following error detection. I thereby provide in such systems for earlier decoding of error position than would otherwise be possible.

The foregoing and other features, advantages, aspects and applications of my invention will be more fully understood and appreciated by considering the following detailed description thereof with reference to the accompanying drawings.

$$n=72$$
$$k=64$$

Figure 4:
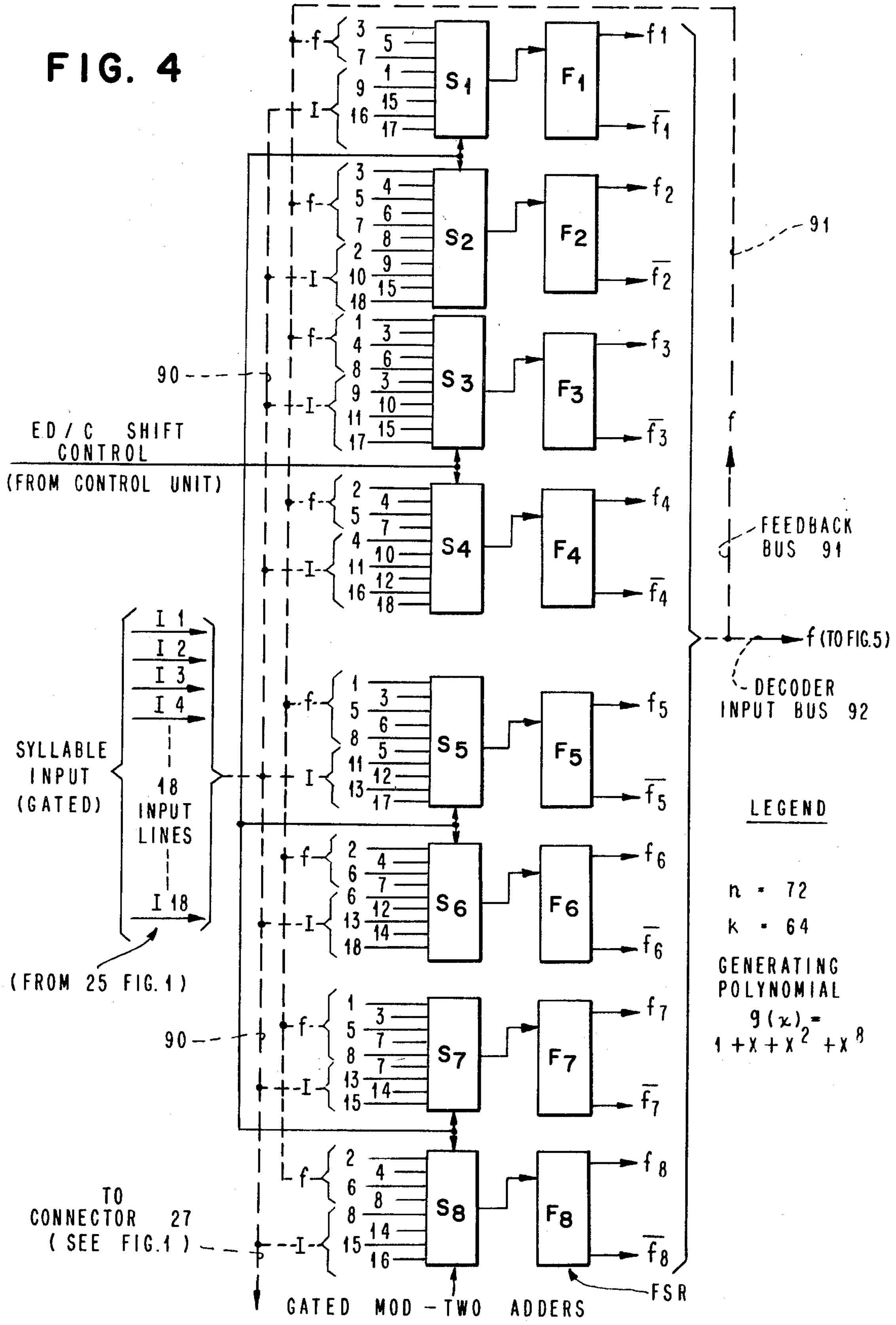
FIGS. 4 and 5 combined contain a schematic showing of a parallel-input parallel-feedback shift register with details of associated input transformation circuits and output decoding circuits as implemented for the specific case $c=18$ and shortened cyclic code.
Figure 5:
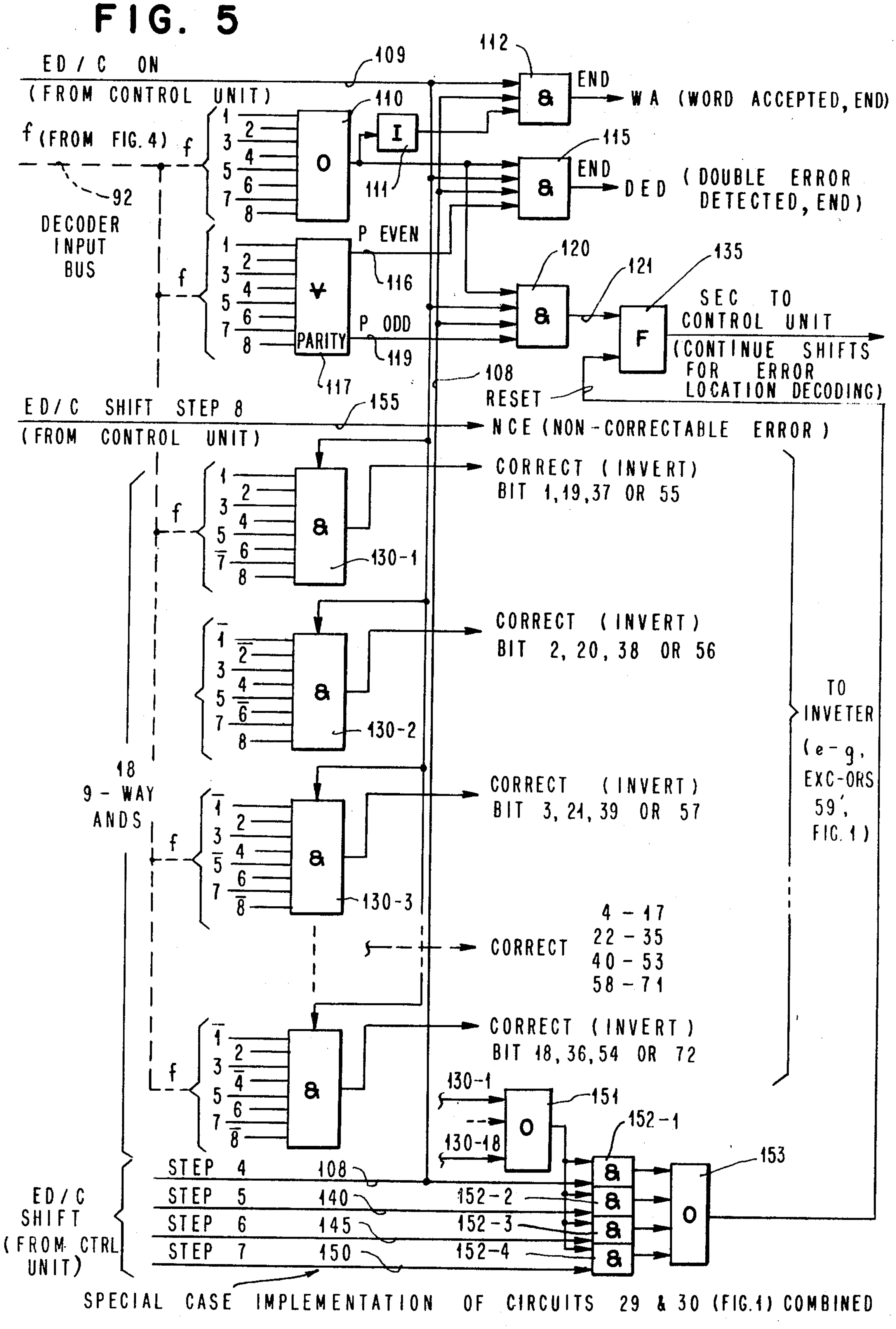
Figure 6:
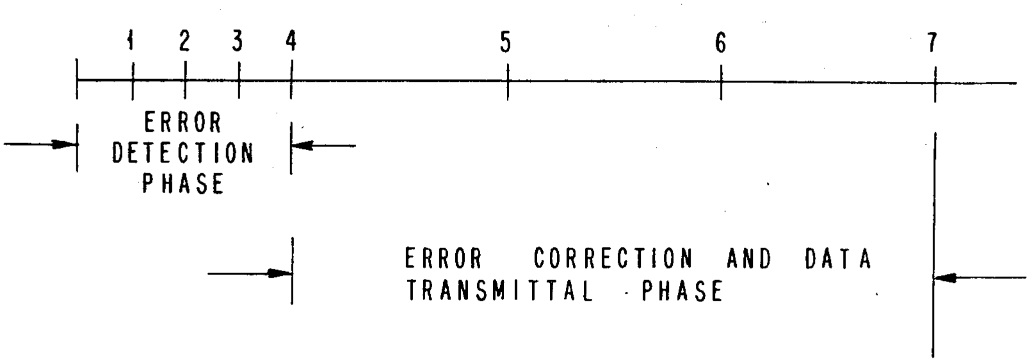
Figure 7:
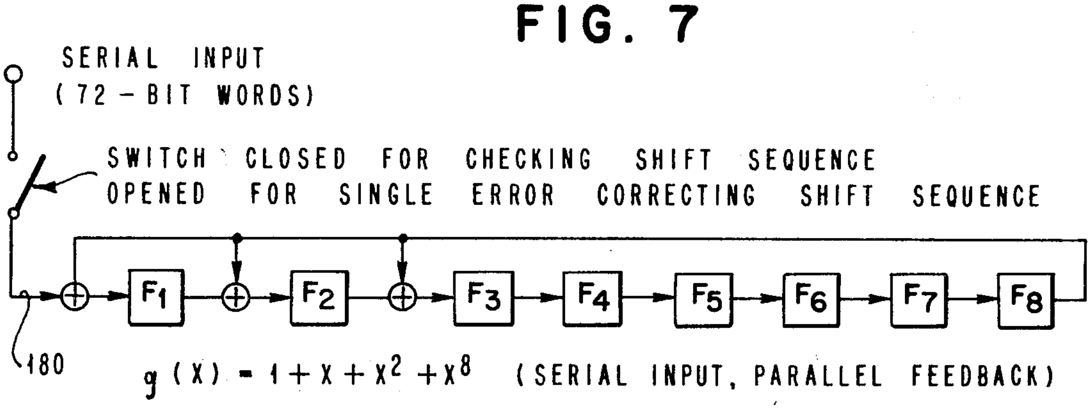
Figure 8:
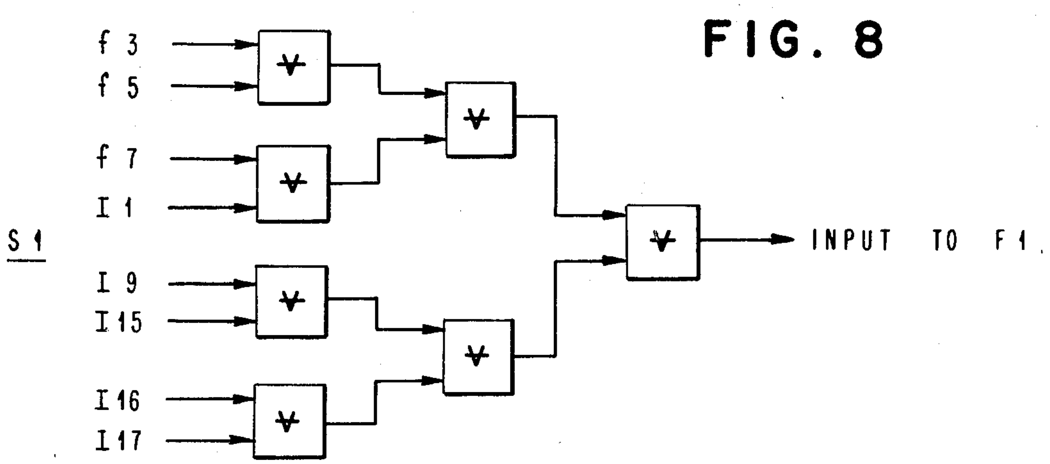

FIG. 6 shows the timing of encoding and decoding functions in the shift apparatus of FIGS. 4 and 5;

FIG. 7 shows the serial equivalent of the parallel input/parallel feedback shift device of FIG. 4;

FIG. 8 is a detailed schematic of one of the modulo two adders (S1) of FIG. 4.

DETAILED DESCRIPTION OF PREFERRED EMBODIMENT—GENERAL OPERATION

Figure 1:
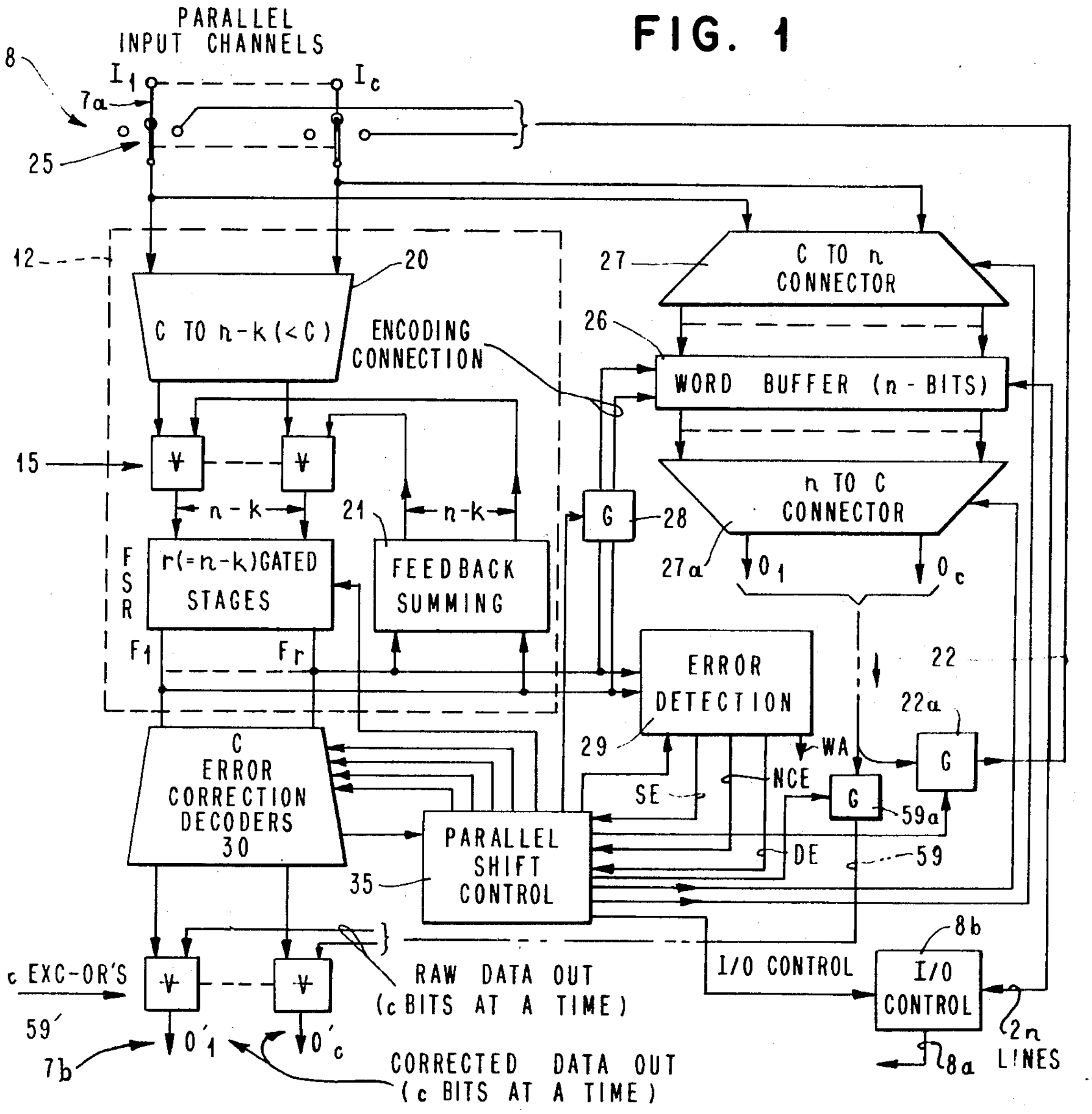
FIG. 1 is a generalized schematic of the subject parallel-input parallel-feedback encoding/checking/error correcting device.
Figure 2:
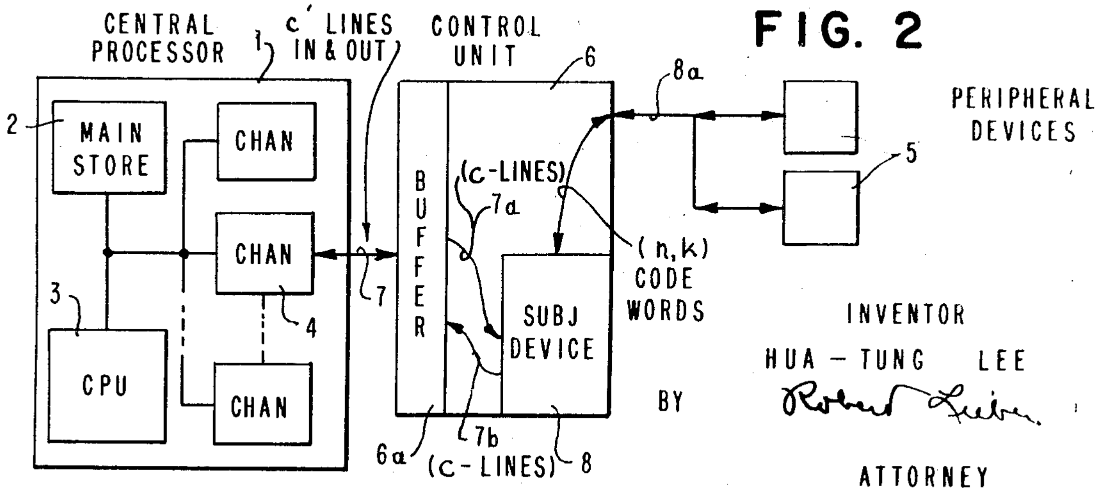
FIG. 2 is a generalized schematic of a real-time data handling system application of the subject device.

FIG. 1 shows the subject device and FIG. 2 illustrates how it is applied with particular effectiveness to the problem of encoding and decoding data signals passing through the I/O channels of a data processing system. Other forms of the subject device and other applications thereof will become apparent as the description proceeds.

In FIG. 2 central processor 1 includes main store 2, central processing unit 3, and a number of channel units 4. Each channel unit connects to multiple peripheral devices such as 5 through a control unit 6. The control unit has a buffer facility 6*a* for queueing data and parity check signals at the interface between the control and channel units. An interface cable 7 is shown which carries $c'$ signals over the channel control unit interface. My device indicated at 8 has parallel cable connections 7*a*, 7*b* to buffer 6*a* whereby $c$ element signal groups can be handled between the device and the buffer in directions indicated by arrowheads. The numerical significance of $c'$ and $c$ will become clear as the description proceeds. The number of lines in cable 8*a* which links the subject device with the peripheral devices 5 is immaterial to the application of the invention shown in FIG. 2 because the operating speed constraints imposed on the device are assumed here to be related only to the channel-control unit interface organization. For this discussion it is assumed to be $n$.

In the environmental application of FIG. 2, it is further assumed that the signals handled over the channel-control unit interface 7 are in the form of raw data combined with simple parity check signals whereas the signals handled over the control unit-peripheral device interface 8*a* are assumed to be in the form of raw data combined with supplemental signals forming $(n,k)$ cyclic code words.

As indicated in the more detailed schematic showing of FIG. 1, the subject device 8 contains a linear parallel feedback shift register unit 12. The $r(=n-k)$ gated storage stages of the register denoted FSR have outputs $F_l-F_r$. Setting inputs are applied in parallel to the stages of FSR from $r$ modulo two summing circuits indicated generally at 15 under the control of not shown input shift gating controls. Circuits 15 receive input from circuits 20 and 21. Circuits 20 form modulo two sums of various combinations of input signals received through cable 7*a* or cable 22. Circuits 21 form modulo two sums of various combinations of the feedback outputs of register FSR. Switches 25 are provided to selectively admit input signals from cables 7*a* and 22 to circuits 20 for purposes which will soon become apparent.

In the encoding operation raw data from the channel is supplemented in $k$ element signal groups with groups of $n-k$ check digits to form $(n,k)$ cyclic code words. These words are eventually sent to the peripheral devices via word buffer 26. The lines 7a and switches 25 carry raw data, received from the channel in buffer 6a, over to the modulo two adder circuits 20 and to word buffer 26 through connector 27 in $c$-element groups. Each group of $k$ data signal elements ($k>c>n-k$) is supplemented by $n-k$ terminal 0 signals and converted by the action of circuits 20 and 15, in conjunction with the operation of FSR and feedback circuits 21, into the supplemental check bits of the $(n,k)$ cyclic code. These check bits are then attached by transfer through gates 28 into buffer 26 as terminal digits to the $k$-element raw data group in place of the $n-k$ 0 signals for further handling by a peripheral device as an $(n,k)$ cyclic code word.

In the decoding operation an encoded signal received from a peripheral is first stored in buffer 26 and then checked, corrected when necessary, stripped of the check code bits, and forwarded to the channel through buffer *648* The lines 22 carry $(n,k)$ coded signals from buffer 26 via connector 27a and gates 22a over to the adder 20, again in groups of $c$ signal elements. The circuits 20, 15 and 21 then operate conjointly in a manner similar to the encoding shift sequence to develop a check indication in FSR. This indication should be all zeros for receipt of an error-free word. Circuits 29 are provided for recognizing this condition.

If the error-free condition is detected by circuits 29, the device is controlled to initiate handling of the raw data portion of the code word through buffer 6a over to the channel in $c'$ element groups. In such handling simple parity check digits may be appended to the raw data by means not considered a part of my invention and $c'$ may or may not be identically equal to $c$.

If a check indication of other than all zeros is recognized, the same signifying error in the received code word, the device again in controlled to initiate handling of raw data over to the channel, subject to a possible residue parity exception discussed later, in coordination with an operational procedure designed to correct the error when possible. In the operational procedure for correction switches 25 are set to the open circuit position and circuits 30 are energized to recognize occurrence of any one of $c$ specific patterns of check residue digits in FSR. When circuits 30 do not provide such pattern recognition response an unmodified raw data portion of a first $c$-digit syllable of the checked code word is forwarded from buffer 26 to buffer 6a and from there to the channel in a $c'$-digit signal group. FSR and circuit 21 are then operated through a feedback shift cycle in which the check residue then in FSR is modified by feedback modulo two addition in circuits 15 and 21.

The alternate recognition operation of circuits 30 and feedback shifting operation of FSR are repeated until either specific pattern recognition response occurs in circuits 30 or the entire raw data portion of the checked code word has been sent to the channel. The shift phase at the time of recognition of a pattern response establishes the location of the error in the corresponding $c$-digit syllable of the checked code word and the specific pattern recognized logically designates the particular site of the error within that syllable. Thus, the syllable containing the error may be corrected, on the fly so to speak, in transit to buffer 6a. If the entire raw data portion of a checked word has been sent to the channel with a detected indication of error, but without error recognition and correction, an indication (NCE) that the data contains an uncorrectable error is sent from the device to the channel so that the data will not be misused.

In the foregoing operations device shift controls 35 provide signals to (a) control the sequence of operations of switches 25, circuits 20, 21, 29 and 30, and gating of inputs to FSR: (b) control operation of gates 28 to admit check digits to the buffer 26 and gates 22a to deliver syllables from buffer 26 to circuits 20; (c) control bidirectional word transfers between buffer 26 and peripheral devices via I/O connector 8b and cable 8a; (d) control connection means 27 and 27a to respectively admit syllables into the buffer 26 and extract syllables from the buffer 26.

The specific combinational groupings of feedback inputs to feedback sum circuits 21 and the exact nature of the input summing logic 20 will be clarified as the description proceeds.

The sequence of decoding operations of the device of FIG. 1 in the system of FIG. 2 is described with reference to FIG. 3. The encoding sequence will be considered in somewhat greater detail later. In the checking phase of decoding the contents of FSR, which are initially all zeros, are latched in not shown backup latches prior to each parallel shift operation. The $c$-digit input syllables placed on lines 22 from buffer 26 are combined by modulo two addition with latched feedback states of FSR (step 54, FIG. 3) through the operation of circuits 20, 21 and 15 and stored as new partial residues in FSR.

This process of forming new partial residues in FSR is repeated for each of the $n/c$ syllables in buffer 26 (step 55, FIG. 3) to form the final check residue for the complete word. Then detection circuits 29 (FIG. 1) are actuated to test for the presence of an all zeros pattern in FSR (56, FIG. 3). Due to the input coding the all zeros state in FSR at this stage of shifting will represent the final or check residue condition for an error-free word transfer from the peripherals. Consequently a "yes" response to the all zeros test controls termination of device operation (step 58, FIG. 3). Raw data portions of words stored buffer 26 at such times are considered correct and subject to immediate handling without modification from buffer 26 to output buses 59, 7b (FIG. 1) through gates 59a.

Exclusive Ors 59' between lines 59 and 7b do not affect the output signal because of inactivity in decoder circuits 30 when there is no error.

Upon a "no" response to the all zeros test parallel feedback shifting, with input switches 25 in open circuit position, continues in a manner next described. It may be useful at this stage to store the immediate nonzero check residue state content of FSR in a not shown backup buffer (step 60, FIG. 3) as preparation for a number of optional later uses. Among such uses possibly would be correction of burst error by a table look-up operation, initiation of programmed system diagnostics, and/or retrial of the correction shift sequence in order to assure operational integrity of the shifting device (e.g. by reentry of the buffered check residue state signals into FSR via a not shown gating input path to FSR from the not shown backup storage buffer).

Figure 3:
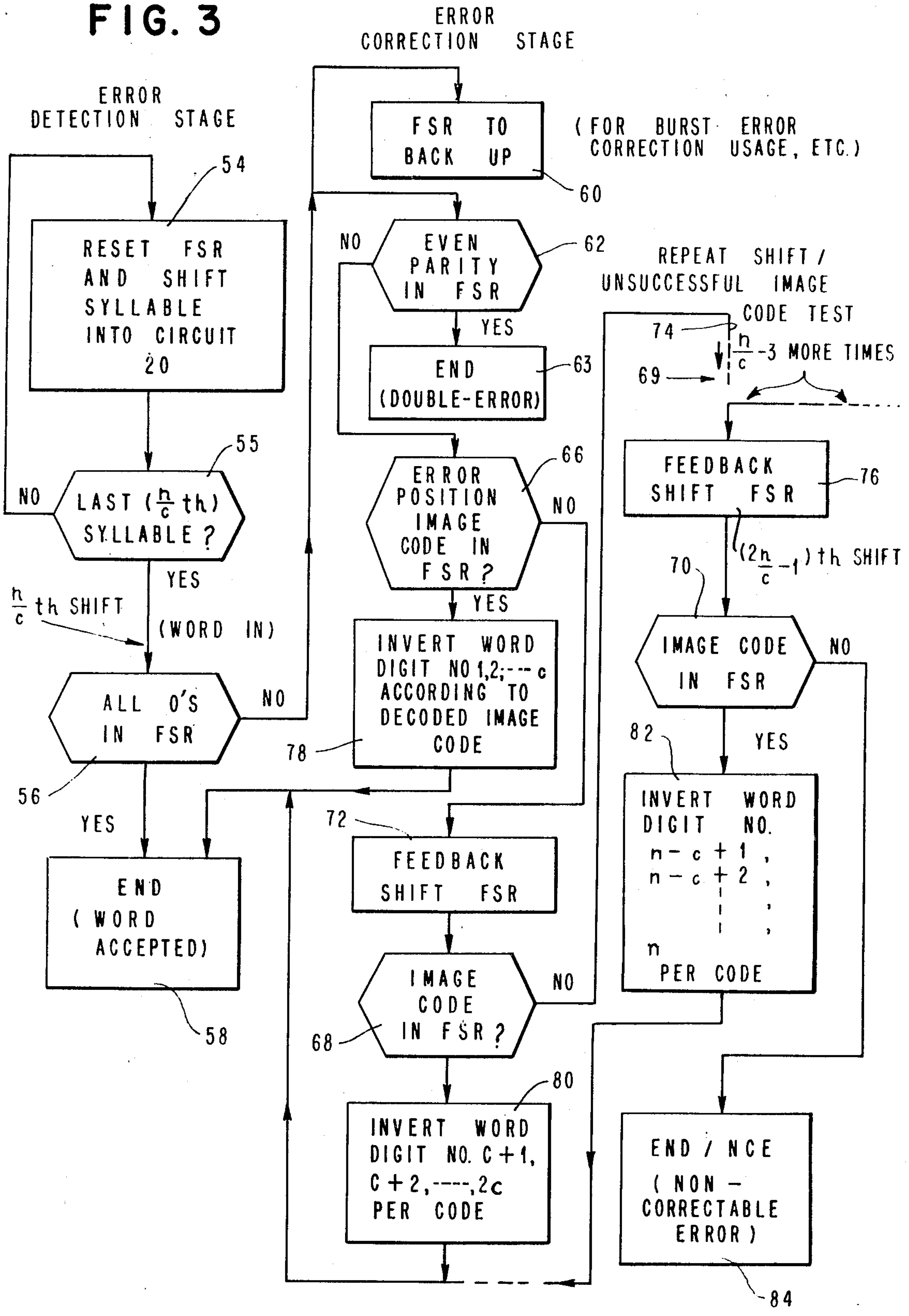
FIG. 3 is a generalized schematic flow chart describing the checking and error correcting operations of the device of FIG. 1 in the system shown in FIG. 2.

At the same time, when the cyclic code used is one having double error detection/single error correction capability, circuits 29 would be actuated to test FSR for even parity (step 62, FIG. 3). It is observed that in a single error correction/double error detection code system odd/even parity of the complete or final nonzero check residue, which is the residue held in FSR at the end of the checking phase of shift cycling (step 56, FIG. 3), is in one to one correlation with the presence of an odd/even number of errors in the buffered code word. Conveniently then when using such a code system a positive response to parity test 62 would indicate immediately that the assembled word contains an even number of two or more errors; a noncorrectable condition, when the subject device is equipped for single error correction only. Naturally, such indication of noncorrectable error would be used to terminate the corrective sequence (step 63, FIG. 3) and would be followed by a diagnostics process, or other corrective action, according to the available facility and need.

Negative response to parity test 62, indicating existence of an odd number of digit errors in the word assembled in buffer 26, is followed by a sequence of alternating tests of the FSR bit states which are designed to locate error sites (66, 68,..., 70, FIG. 3) and conditional shifts of FSR with only feedback inputs active (72,..., 76, FIG. 3) when a site is not recognized. The syndrome tests conducted in circuits 30 (FIG. 1) are designed to establish sites of error in the word representation held in buffer 26 (FIG. 1). This test and shift sequence is terminated either when a syndrome (error locating residue pattern in FSR) is recognized by decoding means 30 or when FSR has been parallel shifted a total of $(2n/c)-1$ times. Of the $2^{n-k}-1$ possible residue states of FSR which may occur during this sequence one observes that there are $c$ particular states which identify uniquely with occurrences of error in respective bit positions of a syllable ($c$-bit) subgroup of the checked word, and would be useful thereby to designate the site of error within a syllable section of word buffer 26. Furthermore it will be shown later that the particular syllable containing error corresponds with the parallel shift phase of FSR when the image test is made.

Consequently a "yes" response to the first syndrome (image code) test (step 66, FIG. 3) would be used by decoder 30 to designate the site of error in the first syllable of the word assembled in buffer 26 (i.e. word bits 1,2,...,$c$). Bits in sites so designated may be corrected by inversion "on the fly" to buffer 6a while passing through the appropriate exclusive Ors 59' of FIG. 1 (step 68, FIG. 3), and the corrective operation of the device may be terminated (step 58, FIG. 3) as if an error-free word had been received. The other syllables of the word could then be sent to the channel buffer 6a without further correction modification.

After a negative first image test response FSR is parallel feedback shifted (step 72, FIG. 3) without data input (switch 25, FIG. 1 in open circuit position) and the image test is repeated (step 68, FIG. 3). A positive response to this second image test localizes the error to the second syllable of the word assembled in buffer 26 (bits $c+1$, $c+2$, ..., $2c$) and the output of decoders 30 indicates the exact location of error within that syllable. Thus, the second syllable can be corrected while on the fly to buffer 6a (step 80, FIG. 3).

This sequence of image code tests followed conditionally by continued cumulative feedback shifts of the check residue is repeated, each iteration being conditioned upon negative response to the preceding image test, until finally either the error in buffer 26 is located and corrected or FSR has been shifted a total of $(2n/c)-1$ times (by control means 35, FIG. 1) counting from and including the first syllable shift (54, FIG. 3) in the error detection phase. After the last image test (70, FIG. 3) there is recognized either single error in the last ($n$th/$c$) syllable of the assembled word, which can be corrected in the same manner as the first syllable (82, FIG. 3) or the error is assumed to be uncorrectable (84, FIG. 3).

It will be appreciated that the checking shift sequence may be executed as soon as encoded data is made available from the peripherals and is therefore not constrained by the timing of channel demands. However the continued shifts which are used to search for error correction syndrome patterns while the raw data is being transferred to the channel are dependent in time upon the channel demand rate. Hence checking shifts can be performed as fast as my device circuits can be made to operate (note FIG. 6), thereby effecting useful reductions in the time devoted to error detection, while the continued shifts for error correction are optimally matched in time to the channel transfer function.

Operation of Example With Specific Word Size

The foregoing is more easily summarized and appreciated by referring to the specific device embodiment shown in FIGS. 4 and 5 based upon the specific case:

$$n=72$$
$$k=64$$
$$c=18$$

The (72, 64) code is a shortened cyclic code useful to detect double errors and to correct single errors.

FIG. 4 indicates that various multiples of the 18 ($=c$) syllable input lines I1, I2,..., I18 couple to the 8 ($=n-k$) modulo two adder circuits S1, S2,..., S8. Outputs of the adders couple to setting inputs of respective register stages F1, F2,..., F8 of FSR. Various multiples of the register true outputs which are denoted $f1$, $f2$,..., $f8$ also connect as feedback inputs to the summing circuits S1–S8.

The various combinations of input connections from switches 25 to the summing circuits are suggested schematically in the drawing by dotted lines 90, letter designations "I" and specific subscript numerals (e.g. 1, 9, 15, 16, 17 at S1 input). Feedback connection combinations are indicated similarly on the drawing in a schematic form by dotted line 91 which may be viewed as representing a feedback bus, letter designations "$f$" and specific subscript numerals (e.g. 3, 5, 7 at S1 input).

Race conditions in the feedback loop formed by the adder and register circuit interconnections are avoided by the well-known expedients of providing not-indicated backup latches, as mentioned, to receive delayed setting inputs from F1–F8, and thereby provide effective signal delays in the feedback path 91, and not-indicated relatively delayed resetting inputs to F1–F8 and such latches.

Extensions 92 of bus 91 connect to the error detection and correction decoding logic circuits of FIG. 5. The sum circuits S1–S8 represent the special case implementation of circuits 15, 20 and 21 combined (FIG. 1).

Replacing $c$ and $(n/c)$ in FIG. 3 by 18 and 4 respectively, and referring to FIGS. 3–6, the details of the decoding operation of my device can now be appreciated in greater depth. In the four step error checking operation the four syllable signal groups forming a 72-bit code word representation (64 raw data bits and 8 supplemental check bits) are transferred successively in parallel form to the 18 device input lines I1, I2, I3,..., I18, from appropriate assembly stages of the word buffer (26, FIG. 1). Only four shifts of FSR are required instead of the nine or more shifts required when smaller input syllables of 8 (i.e. $n-k$) or less bits are used to form the FSR residues.

Each word is checked for correctness by ascertaining in the detection logic of FIG. 5, that after the fourth shift, denoted step 4 and indicated by mark conditions on lines 108 and 109, all eight residue bits in FSR are 0. When this is verified output of OR circuit 110 (FIG. 5) is inverted in inverting circuit 111 and applied to partially conditioned AND circuit 112 to produce the Word Accepted (WA) output signal signifying the error free handling of the code word contained in buffer 26 (FIG. 1).

If the 4th step check residue is not all 0's but has even parity AND circuit 115 (FIG. 5) will be conditioned by the combination of the error condition represented by uninverted marked output of OR 110 and an even parity mark indication obtained through line 116 from circuit 117 which forms the modulo two sum of the FSR bits. Hence, mark output from AND 115 signifies Double Error Detection (DED) because in this particular case (double error detecting/single error correcting code) the number of errors in the received word and the parity of the 4th step FSR residue have a predetermined relationship which will be clarified later in discussing the generating polynomial upon which the particular division process of residue formation is based.

Odd parity indication from sum circuit 117 on line 119, in the 4th shift step, indicating occurrence of an odd number of bit errors in the checked word, is detected by partly conditioned AND circuit 120. Output of AND 120 on line 121 conditions the device controls for the Single Error Correction (SEC) sequence. In this sequence the FSR output is tested by the logic of the 18 AND circuits 130—1, 130—2,..., 130—18, during a period established by the set state of flip-flop 135. Flip-flop 135 is set by output 121 from AND 120 and reset by means discussed later.

ANDS 130—1 to 130—18 respond to 18 unique sequence states of FSR known as error locating syndromes. These states have unique relations of correspondence at shift steps 4–7 with sites of single errors in the checked word. Syndromes detected in step 4 point to error in the first received syllable of the checked word (i.e. bit positions 1, 2, 3,..., 18). Thus at shift step 4 output of AND 130—1 signifies error in word bit 1, output of AND 130—2 signifies error in word bit 2, and so forth.

If error site location is not established at shift step 4 the first syllable of the checked word may be sent from buffer 26 to the channel interface buffer 6*a* (FIG. 1) while FSR (FIG. 4) is feedback shifted (shift step 5) with inputs I1–I18 blocked (switch 25 in open circuit position). Line 140 is placed in marked condition and the site location test is repeated in the 18 ANDS 130 to ascertain if and where error may have occurred in the second syllable of the checked word (bit positions 19, 20,..., 36).

If error site location is not established at step 5 the second syllable may be transferred from buffer 26 to channel buffer 6*a* and FSR is parallel shifted (shift step 6) again with inputs I blocked. Line 145 is placed in marked condition (step 6) and the site location test is repeated in circuits 130. Output at this shift stage locates an error site in the third syllable of the checked word (bit 37, 38, ..., 54).

If error site is not established at shift step 6 the next group of 16 bits is advanced to the channel buffer 6*a* and FSR is feedback shifted again (shift step 7) with inputs I blocked. Line 150 is placed in marked condition (step 7) and the FSR residue is subjected to syndrome tests by circuits 130 designed to locate at this shift phase error sites in the fourth syllable of the checked word (bit 55, 56, ..., 72).

If error site is established at any of the foregoing syndrome tests (OR 151 and one of the ANDS 152—1 to 152—4 in a marked output condition) the bit designated by the uniquely marked output of one of the AND circuits 130 is inverted by not shown means corresponding to Exclusive Ors 59' (FIG. 1) as the corresponding syllable of the word is advanced to the channel buffer 6*a*. The shift sequence would then be terminated by resetting of flip-flop 135 through OR 153 while the remaining syllables of the word are handled to the buffer 6*a* in the error free manner. If error site is not established by shift step 7 line 155 (step 8) is marked to provide End control signifying to the channel that the just transferred word contains a Noncorrectable error (NCE).

Foregoing correlation between particular residue states of FSR during shift steps 4–7 and particular single error sites in the 72-bits of the checked word is set forth concisely in Table 1 below. This table also relates code word data bit positions with specific input lines I1,..I18.

feedback shift circuits and the availability of the signals to be checked.

The timing of encoding incidental to the handling of raw data from the channel buffer 6*a* over to buffer 26 and the parallel shift logic of FIGS. 4 and 5 would be comparable to the handling of decoded signals from buffer 26 over to the channel buffer 6*a*. A four-step operational sequence on 64 raw data bits is involved.

At each of the first three steps 18 raw data bits would be handled through the shift device, and on the fourth step the shift input would be formed by 10 raw data bits and 8 "zero" bits inserted by the controls. At the completion of the fourth shift the FSR contents representing the check residue portion of the code word would be appended to the 64 raw data bits in the buffer 26 to form a code word for transmittal to the appropriate peripheral device. Gates 28 (FIG. 1) are provided for this purpose.

The code form of the data received from the channel and sent to the channel is of course immaterial to the present invention. Hence $c'$ need not be equal to $c$ in FIG. 2. Conveniently however data signals are transferred between channels 4 and buffer 6*a* in 16 bit (2 byte) groups accompanied by 2 simple (byte) parity check digits. These parity check digits would be utilized only for checking the transfer of the raw data signals over the channel interface lines 7 and would be discarded after checking by the system incorporating my device. In the reverse direction the parity check digits would be generated and appended to the outgoing data signals when sent to the channel from buffer 6*a*.

With these constraints it will be appreciated that encoding would be delayed relative to arrival in buffer 6*a* of raw data signals sent from the channel until full groups of 18 bits, exclusive of parity check bits, are assembled in buffer 6*a*. Thus an encoding delay of one syllable transfer period would be expected.

With the same constraints error correction decoding would not be delayed in time since the first three code syllables contain only raw data and therefore could be transferred to buffer 6*a* during FSR shift steps 4–6 and 2 parity check bits could be appended to each group of 16 raw data bits leaving buffer 6*a* over lines 7. This will leave only 6 bits of raw data in buffer 6*a* to be handled with the 10 raw data bits of the fourth code syllable in the 4th transfer step at shift step 7.

The inputs to the summing circuits S1–S8 in FIG. 4 and the inputs to ANDS 130—1 to 130—18 in FIG. 5 are determined by a matrix listing technique discussed next with reference to FIG. 7. As discussed extensively in the literature and in the

TABLE 1

| Error on line | Error syndrome pattern | | | | | | | | Matrix vector Identity in the list of auton. states | Bit for which EC will be made when specific image pattern is recognized on— | | | |
|---|---|---|---|---|---|---|---|---|---|---|---|---|---|
| | $f_1$ | $f_2$ | $f_3$ | $f_4$ | $f_5$ | $f_6$ | $f_7$ | $f_8$ | | Shift No. 4 | Shift No. 5 | Shift No. 6 | Shift No. 7 |
| I18 | 1 | 1 | 1 | 1 | 1 | 1 | 0 | 1 | 72d vector | 1 | 19 | 37 | 55 |
| I17 | 0 | 0 | 1 | 1 | 1 | 0 | 1 | 1 | 71st vector | 2 | 20 | 38 | 56 |
| I16 | 0 | 1 | 1 | 1 | 0 | 1 | 1 | 0 | 70th vector | 3 | 31 | 39 | 57 |
| I15 | 1 | 1 | 1 | 0 | 1 | 1 | 0 | 0 | 69th vector | 4 | 22 | 40 | 58 |
| I14 | 0 | 0 | 0 | 1 | 1 | 0 | 0 | 1 | 68th vector | 5 | 23 | 41 | 59 |
| I13 | 0 | 0 | 1 | 1 | 0 | 0 | 1 | 0 | 67th vector | 6 | 24 | 42 | 60 |
| I12 | 0 | 1 | 1 | 0 | 0 | 1 | 0 | 0 | 66th vector | 7 | 25 | 43 | 61 |
| I11 | 1 | 1 | 0 | 0 | 1 | 0 | 0 | 0 | 65th vector | 8 | 26 | 44 | 62 |
| I10 | 0 | 1 | 0 | 1 | 0 | 0 | 0 | 1 | 64th vector | 9 | 27 | 45 | 63 |
| I9 | 1 | 0 | 1 | 0 | 0 | 0 | 1 | 0 | 63d vector | 10 | 28 | 46 | 64 |
| I8 | 1 | 0 | 0 | 0 | 0 | 1 | 0 | 1 | 62d vector | 11 | 29 | 47 | 65 |
| I7 | 1 | 1 | 0 | 0 | 1 | 0 | 1 | 1 | 61st vector | 12 | 30 | 48 | 66 |
| I6 | 0 | 1 | 0 | 1 | 0 | 1 | 1 | 1 | 60th vector | 13 | 31 | 49 | 67 |
| I5 | 1 | 0 | 1 | 0 | 1 | 1 | 1 | 0 | 59th vector | 14 | 32 | 50 | 68 |
| I4 | 1 | 0 | 0 | 1 | 1 | 1 | 0 | 1 | 58th vector | 15 | 33 | 51 | 69 |
| I3 | 1 | 1 | 1 | 1 | 1 | 0 | 1 | 1 | 57th vector | 16 | 34 | 52 | 70 |
| I2 | 0 | 0 | 1 | 1 | 0 | 1 | 1 | 1 | 56th vector | 17 | 35 | 53 | 71 |
| I1 | 0 | 1 | 1 | 0 | 1 | 1 | 1 | 0 | 55th vector | 18 | 36 | 54 | 72 |

Clearly then after a number of shifts of FSR, between 4 and 7, the decoding functions of error checking and error correction incidental to code word handling will have been completed (note FIG. 6). Again it is noted that only the shifts associated with transferral of the information signals to the channel and the coincident correction of errors are time dependent upon the signal handling function and the timing of error checking is limited only by the capabilities of the parallel above-referenced patent to Hsiao et al. each $(n,k)$ cyclic code system has a characteristic generator polynomial of degree $n-k$, $g(x)=1+a_1x+a_2x^2+\ldots+a_{n1k}x^{n1k}$ in which coefficients $a_1$, $a_2\ldots$ have values 1 or 0 for binary codes. When code word polynomials are divided by the generating polynomial residue codes are formed which have unique relation to occurrences of error in the word. Hence the residue codes are useful for error correction.

In the ordinary serial polynomial division as suggested in FIG. 7 the word to be checked is shifted one digit place at a time through a modulo two adder into an $n-k$ stage serial shift register and the output of the last register stage is fed back to several interstage modulo two adders according to wiring connections based upon the generator polynomial coefficients.

Both the parallel input/parallel feedback shift device of FIGS. 4 and 5, and the serial input/parallel feedback device of FIG. 7 are based upon the generator polynomial $g(x)=1+x+x^2+x^8$. The code generated by this particular polynomial is known to be a single error correction/double error detection code. When the serial register is feedback shifted from the initial state in which the register stages F1 to F8 hold the combinational state 10000000 and if the direct signal input 180 is blocked the sequential residue states of the register are given by the rows of the following matrix:

| | | | | | | | | | |
|---|---|---|---|---|---|---|---|---|---|
| I1---- | 1 | 0 | 0 | 0 | 0 | 0 | 0 | 0 | . . . Row 1. |
| I2---- | 0 | 1 | 0 | 0 | 0 | 0 | 0 | 0 | |
| ...... | 0 | 0 | 1 | 0 | 0 | 0 | 0 | 0 | |
| ...... | 0 | 0 | 0 | 1 | 0 | 0 | 0 | 0 | |
| ...... | 0 | 0 | 0 | 0 | 1 | 0 | 0 | 0 | |
| ...... | 0 | 0 | 0 | 0 | 0 | 1 | 0 | 0 | |
| ...... | 0 | 0 | 0 | 0 | 0 | 0 | 1 | 0 | |
| ...... | 0 | 0 | 0 | 0 | 0 | 0 | 0 | 1 | |
| ...... | 1 | 1 | 1 | 0 | 0 | 0 | 0 | 0 | =Rows 1–18, input connection matrix. |
| ...... | 0 | 1 | 1 | 1 | 0 | 0 | 0 | 0 | |
| ...... | 0 | 0 | 1 | 1 | 1 | 0 | 0 | 0 | |
| ...... | 0 | 0 | 0 | 1 | 1 | 1 | 0 | 0 | |
| ...... | 0 | 0 | 0 | 0 | 1 | 1 | 1 | 0 | |
| ...... | 0 | 0 | 0 | 0 | 0 | 1 | 1 | 1 | |
| ...... | 1 | 1 | 1 | 0 | 0 | 0 | 1 | 1 | |
| ...... | 1 | 0 | 0 | 1 | 0 | 0 | 0 | 1 | |
| ...... | 1 | 0 | 1 | 0 | 1 | 0 | 0 | 0 | |
| I18--- | 0 | 1 | 0 | 1 | 0 | 1 | 0 | 0 | |
| f1---- | 0 | 0 | 1 | 0 | 1 | 0 | 1 | 0 | |
| f2---- | 0 | 0 | 0 | 1 | 0 | 1 | 0 | 1 | |
| ...... | 1 | 1 | 1 | 0 | 1 | 0 | 1 | 0 | |
| ...... | 0 | 1 | 1 | 1 | 0 | 1 | 0 | 1 | =Rows 19–26, feedback connection matrix. |
| ...... | 1 | 1 | 0 | 1 | 1 | 0 | 1 | 0 | |
| ...... | 0 | 1 | 1 | 0 | 1 | 1 | 0 | 1 | |
| ...... | 1 | 1 | 0 | 1 | 0 | 1 | 1 | 0 | |
| f8---- | 0 | 1 | 1 | 0 | 1 | 0 | 1 | 1 | . . . 26th row. |
| | 1 | 1 | 0 | 1 | 0 | 1 | 0 | 1 | |
| | | | | . . . | | | | | (28th–52nd rows). |
| | 0 | 1 | 1 | 1 | 1 | 0 | 0 | 1 | |
| | 1 | 1 | 0 | 1 | 1 | 1 | 0 | 0 | |
| | 0 | 1 | 1 | 0 | 1 | 1 | 1 | 0 | . . . 55th row. |
| | 0 | 0 | 1 | 1 | 0 | 1 | 1 | 1 | |
| | 1 | 1 | 1 | 1 | 1 | 0 | 1 | 1 | |
| | 1 | 0 | 0 | 1 | 1 | 1 | 0 | 1 | |
| | 1 | 0 | 1 | 0 | 1 | 1 | 1 | 0 | |
| | 0 | 1 | 0 | 1 | 0 | 1 | 1 | 1 | |
| | 1 | 1 | 0 | 0 | 1 | 0 | 1 | 1 | |
| | 1 | 0 | 0 | 0 | 0 | 1 | 0 | 1 | |
| | 1 | 0 | 1 | 0 | 0 | 0 | 1 | 0 | =Rows 55–72 syndrome matrix for error correction. |
| | 0 | 1 | 0 | 1 | 0 | 0 | 0 | 1 | |
| | 1 | 1 | 0 | 0 | 1 | 0 | 0 | 0 | |
| | 0 | 1 | 1 | 0 | 0 | 1 | 0 | 0 | |
| | 0 | 0 | 1 | 1 | 0 | 0 | 1 | 0 | |
| | 0 | 0 | 0 | 1 | 1 | 0 | 0 | 1 | |
| | 1 | 1 | 1 | 0 | 1 | 1 | 0 | 0 | |
| | 0 | 1 | 1 | 1 | 0 | 1 | 1 | 0 | |
| | 0 | 0 | 1 | 1 | 1 | 0 | 1 | 1 | |
| | 1 | 1 | 1 | 1 | 1 | 1 | 0 | 1 | . . . 72nd row. |
| | 1 | 0 | 0 | 1 | 1 | 1 | 1 | 0 | |
| | 0 | 1 | 0 | 0 | 1 | 1 | 1 | 1 | |

Inspection of the columns of the first 26 rows of this autonomously produced matrix provides some insight into the residues created when a single bit is shifted into the register of FIG. 7 and undergoes 18 further autonomous shifts (i.e. shifts with feedback only). This will provide insight therefore into the logic required to perform parallel polynomial division of a 72-bit word in parallel segments of 18 bits at a time.

Note for instance that the first column, which represents the sequential states of register stage $F_1$ in FIG. 7, HAS 1 state entries in the 1st, 9th, 15th, 16th, 17th, 21st, 23rd, and 25th, rows and 0 states elsewhere. Observe therefore that the 1 initially entered in the first row position when autonomously shifted 18 successive steps affects the state of $F_1$ only at the 1st, 9th, 15th, 16th, and 17th shift steps. Observe further that the state of the register prior to entering the 1 in the first row position will also have an effect upon $F_1$ due to feedback as seen with reference to the 19th to 26th rows of the matrix.

The effect on $F_1$ of the presence of a 1 in any particular register stage, say $F_3$, prior to entry of the first 1 is the same as having the register initially holding the state given by the corresponding one of the first rows; in the case of $F_3$ the 3rd row. Now after 18 autonomous shifts the effect of the 3rd row is of course reflected in the 21st row of the matrix. Consequently it will be seen that an initial 1 in $F_3$ will constitute a 1 feedback input to $F_1$ after 18 autonomous shifts. In this way by observing columns of the submatrix formed by the 19th to 26 matrix rows it will be seen that the initial states of only $F_3$, $F_5$ and $F_7$ in the register would be affecting the state of $F_1$ in the register at the conclusion of the 18 autonomous shifts represented by the first 18 matrix rows.

Consequently, it is seen that the operation of the serial register at stage $F_1$, for groups of 18 consecutive input shifts, can be simulated in a single parallel input shift by forming the modulo two sum of signals on input lines I1, I9, I15, I16 and I17 in combination with the states of stages $F_3$, $F_5$, and $F_7$ taken as feedback. Referring to FIG. 4 it is seen that the input to $F_1$ formed by modulo two adder S1 is exactly this modulo two sum. The inputs to the other adders S2–S8 and the method by which they have been determined should now be apparent from the notation of FIG. 4 and the above matrix.

For example the state of $F_2$ (FIG. 7) after 18 successive serial input shifts can be simulated (FIG. 4) in a single parallel input shift (refer to the first 26 rows of the second column of the above matrix) by forming the modulo two sums of signals in input channel positions I2, I9, I10, I15, I18, and feedback positions $F_3$, $F_4$, $F_5$, $F_6$, $F_7$, and $F_8$. Thus inputs to S2 can be verified to be as shown in FIG. 4.

By inspection and following the above reasoning the argument inputs to each of the other sum circuits S3–S8 (FIG. 4) are readily specified and it is seen that these inputs are identical as shown in FIG. 4.

To understand the basis for the correction decoding operation of circuits of FIG. 5 reference is had again to the above autonomously produced matrix listing, this time taking into account its extension through the 72nd row. Given a generating polynomial of the form shown in FIG. 7 it is easily verified that the indicated sequence of vector states (matrix rows), which represent register residue states produced by autonomous serial shifting of a single 1 state with parallel feedback and no other input, are unique in the sense that all residue states in a frame of 127 consecutive states differ from each other and repeat in a periodic pattern from frame to frame.

It is noted incidentally that in this case the code word length $n=72$ is considerably shorter than the shift residue cycle length 127, and that indeed this code is one of the so-called shortened codes considered in the literature (note previous Peterson reference above). The noteworthy aspect of this will soon become clear.

By inspection is is seen that each row of the particular autonomously generated matrix above contains an odd number of 1 states. Now understanding that when a code word of 72 bits is manipulated without error relative to the serial register of FIG. 7 or its 18 bit parallel equivalent of FIG. 4, the final check residue state of the register will be 00000000, it follows that when an error is shifted into the register its effect determines the nonzero state of the final check residue as if the other data signals had not been shifted into the register.

Consequently assuming error occurs in an arbitrary $p$th bit of a 72-bit word being checked that error bit undergoes effectively $72-p$ shifts by the time the final check residue is formed. Thus if the register is feedback shifted $55+p$ extra shifts, after reaching the final check residue state, the error bit will have been shifted 127 times effectively $(72-p+55+p)$ and therefore the state of the serial register at error checking time will have cycled to the particular state given by the first row of the autonomous matrix, namely 10000000.

When the register first shifts into the repeated state 10000000 after 55+$p$ extra shifts it is clear that a count of the total extra shifts reduced by 55 would be useful to establish the number $p$ indicative of the error site. However, the extra 55 shifts would be wasteful of time in the present shortened code system and can be eliminated by the present method. Observe that rows 55–72 of the matrix correspond as residue states to the first row state of the matrix after 54–71 respective autonomous shifts. Consequently when a single error is contained in only the first syllable of a received word ($p$=1, 2,...,18), and therefore undergoes the equivalent of 4×18–$p$ serial shifts by the time the final check residue appears in FSR (i.e. at shift step 4), the final check residue will be identical to the (72–$p$+1)th matrix row. Hence the effect of error in any of the first 18 word bit positions appears immediately in the final check residue at step 4 and can be decoded to locate the error specifically. For this I have provided 18 parallel decoders designed to recognize occurrences of any of the codes given by matrix rows 55–72; specifically, the decoder logic of AND circuits 130—1 to 130—18 in FIG. 5.

More specifically AND 130—1 (FIG. 5) is conditioned to respond to a check residue state 11111101 in FSR (noting that notations $f$ and $\bar{f}$ respectively designate true and complement outputs of the register in the positions designated by the subscript numerals) corresponding to the 72nd row of the matrix. Observe also in this regard that the first bit of a checked word receives 71 effective shifts by shift step 4 (i.e. 17 effective shifts as the partial check residue of the 1st syllable is formed, 18 additional effective shifts as the partial check residue of the second syllable is formed, and so forth). Hence a 1 incorrectly added or dropped at the first input bit position prior to shift step 1, amounting to modulo two addition of an extra 1 in register stages affected by I18, at shift step 1, should cause the final check residue 11111101 to appear in FSR at shift step 4 if no other error has occurred. Thus when output of 130—1 is marked at shift step 4 at which time AND 152—1 is also marked the first bit of the first syllable of the checked word is corrected by inversion during on the fly transfer of the syllable through exclusive ORS such as 59' (FIG. 1), the correction being made in the said first bit of that syllable by marking the control input of the corresponding exclusive OR 59' with the output of 130—1.

Similarly, it is observed with reference to FIGS. 4 and 5, that AND 130—2 (FIG. 5) is conditioned—by its particular connections to $\bar{f}1, \bar{f}2, f3, f4, f5, \bar{f}6, f7, f8$—to react only to FSR residue state 00111011 corresponding to the 71st row of the autonomous matrix. Since this also represents the state of the equivalent serial register of FIG. 7 after 70 autonomous shifts of the state 10000000 it is recognized that bit 2 of the checked word in buffer 26 (FIG. 1) requires correction when the check residue is 00111011 (i.e. when output of AND 130—2 is marked at shift step 4).

Clearly when ANDS 130—3, ANDS 130—4 to 130—17 (not shown), and AND 130—18 in FIG. 5 are respectively conditioned at shift step 4 by combinational outputs of FSR corresponding to respective rows 70—55 of the above autonomous matrix then they will designate sites of single errors in respective bit positions 3–18 of the checked word in accordance with Table 1 above.

Recognize further that if single error occurs in the second syllable group of 18 bits of an input code word ($p$=19, 20,...,36) its effect upon the check residue will be realized at step 5 after the equivalent of 5×18–$p$ serial shifts. This again represents between 54 and 71 shifts of the basic error pattern 10000000 depending upon $p$. Consequently operation of one of the decode ANDS 130—1 to 130—18 in conjunction with AND 152—2 (FIG. 5) at shift step 5 will identify single error sites in respective 19th to 36th bit positions of a checked 72-bit word retained in buffer 26 (FIG. 1). Note that this too is detailed in Table 1 above.

From the above discussion and the notation used in FIGS. 4 and 5 it is clear that operations of ANDS 130—1 to 130—18 in shift step 6 or 7 in conjunction with AND 152—3 or 152—4 respectively will identify single error sites in corresponding bits 36–72 of the checked word.

It will now be clear that there are several key aspects to my invention.

I have shown first that for any ($n,k$) cyclic code I can construct a network of $n–k$ modulo two adders coupling to respective stages of an $n–k$ stage register which will accept $k$ raw data bits augmented with $n–k$ terminal 0 bits, in parallel groups of $c$ bits ($n>c>n–k$), and generate from these $n–k$ check bits forming the desired code word.

I have also shown that $n$-digit encoded words can be checked for error by presenting the word, in $c$-bit parallel groups, to the same apparatus used for encoding.

Third, I have shown that when the cyclic code is a so-called shortened code the shift register apparatus can be adapted to provide unique site identification of errors in a shortened extra shift sequence following the checking sequence. In this I have shown that it is not necessary as suggested by the art to complete the basic serial shift cycle of the full length code and to await the appearance in the shift register of the elementary residue state given by the first row of the autonomous matrix associated with the generating polynomial. Instead I provide for site identification at an earlier stage of continued shifting utilizing parallel shifts and decoding register residue states corresponding to ($n–c+1$)th to $n$th rows of the autonomous matrix. These can be found easily by calculation upon a general purpose computer, or more tediously by hand calculation. As observed, these states have unique relations as residue codes to specific error sites in checked words and in particular to error sites in specific $c$-digit syllables of the words. Hence recognizing these $c$ residue states in parallel with parallel shifts I provide more rapid error correction.

Fourth, I have shown that for a specific (72,64) code used for single error correction and double error detection the recognition of uncorrectable double errors, or other even numbers of errors, can be hastened by simply detecting the parity of the nonzero check residues.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. In apparatus including an $n–k$ stage residue accumulating register for checking and correcting errors in groups of $n$ signals by arrangement of the signals in an ($n,k$) cyclic code system the improvement comprising:

means for forming $n–k$ parallel signals representing predetermined logic functions of $n–k$ distinct subcombinations of groups of $c+n–k$ parallel signals, each group consisting of $c$ of said $n$ signals and the $n–k$ outputs of said register, where $c$ is a number greater than $n–k$ and less than $n$; and means for applying said $n–k$ signals representing logic functions in parallel, as residue representing inputs pertaining to said code, to inputs of respective stages of said residue accumulating register.

2. In apparatus including an $n–k$ stage feedback shift register and means associated therewith for detecting and correcting errors in groups of $n$ signals arranged in an ($n,k$) shortened cyclic code the improvement comprising:

logical decoding means activated coincidentally with detection of a nonzero check residue state in said register which indicates occurrence of a said error in a said group of $n$ signals for analyzing said residue and conditionally responsive thereto to provide immediate specific indication of error location in a particular subgroup of $c$ of said $n$ signals, when the said residue state corresponds to a row in one particular subgroup of $c$ rows of an $n$-row by $n-k$ column autonomous matrix listing associated with said code, where $c$ is greater than $n-k$ and less than $n$.

3. In apparatus including an $n-k$ stage parallel input parallel feedback shift register and means associated therewith for detecting and correcting errors in groups of $n$ signals arranged in an $(n,k)$ shortened cyclic code the improvement comprising:

a plurality of $c$ logical decoding means, $c$ being an integer greater than $n-k$ and less than $n$, activated in parallel upon detection of a said error in said signals to analyze the residue output of said register and recognize occurrence therein of any of $c$ predetermined states uniquely associated with the position of a said error in said signals; said predetermined states corresponding to $c$ respective rows of an $n-k$ column by $n$ row autonomous matrix listing uniquely associated with said code.

4. In apparatus for handling bidirectional transmission of intelligence signals in parallel sets of $c$ signals at a time, a device useful for encoding raw data groups of $k$ of said signals $c$ at a time into respective groups of $n$ signals arranged according to an $(n,k)$ cyclic code $(n>c>n-k)$ and for decoding encoded groups of $n$ of said signals, when received $c$ at a time in said $(n,k)$ code form, in order to detect and correct errors in the received coded signals, comprising:

buffer means for storing $n$ binary signals;

a source of first groups of $n$ binary signals, each group consisting of $k$ raw data signals and $n-k$ terminal zero signals, manifested in successive sets of $c$ parallel signals;

means for transferring said $k$ raw data signals and $n-k$ terminal zero signals of each first group from said source to $n$ respective stages of said buffer means in the real time of occurrence of said sets of $c$ parallel signal manifestations;

means operated in time coordination with said $n$ signal transferral to said buffer to derive $n-k$ check signals from said sets of $c$ parallel signal manifestations, said check signals bearing a cyclic code relationship to said $k$ raw data signals, and to deposit said check signals in said $n-k$ stages of said buffer means receiving said terminal zero signals for further handling with said raw data signals as supplemental error checking/error correcting signals;

a source of a supply of second groups of $n$ signals arranged in an $(n,k)$ cyclic error checking/error correcting code form in which each group of $n$ signals consists of $k$ raw data signals and $n-k$ supplemental signals having error checking/error correcting code significance;

means coupled to said second group source for transferring said second groups of $n$ signals to respective stages of said buffer;

means for operating said check signal deriving means relative to parallel sets of $c$ signals in said buffer to form a final check residue signal with $n-k$ elements for each said second group of $n$ signals transferred to said buffer from said second source;

means coupled to said buffer for subjecting at least the $k$ raw data signal portions of said second groups in said buffer to further handling in parallel signal sets of $c$ signals at a time; and means operated upon occurrence of error indication in said final check residue and coordinated in real time with said further handling of said parallel signal groups of $c$ signals for operating said check signal deriving means to subject said final check residue to parallel feedback shift manipulations designed individually to produce unique indications of specific locations of error within respective said sets of $c$ further handled signals in timed coordination with the said further handling.

5. In apparatus for detecting plural errors and correcting single errors in code word groups of $n$ intelligence signals arranged in an $(n,k)$ single error correcting/double error detecting cyclic code form, said apparatus including $n-k$ stage parallel input-parallel feedback shift register means for developing $n-k$ signal check residue indications by manipulation of said $n$ signal groups to indicate the error status of a code word group of $n$ of said intelligence signals and to develop by further logical manipulation of said check residue indications correction indications useful to designate for correction locations of specific single errors within a said code word group of $n$ signals containing an error, the improvement comprising:

parity check means operated to check the parity of said check residue indication and to condition said further logical manipulation for error correction upon the recognition of odd parity in said check residue indication.

6. In apparatus for handling signals in a parallel-serial form upon a given number $c$ of parallel signal conveying channels a device useful alternately for encoding signals into $(n,k)$ cyclic code form $(n>c>n-k)$ whereby errors in said signals may be detected and corrected in other apparatus, and for decoding encoded signals from said $(n,k)$ form in order to carry out said detection and correction of errors locally, said device comprising:

an $n-k$ stage register having $n-k$ parallel inputs and $n-k$ parallel outputs;

$n-k$ modulo two adder circuits each having: multiple connections to outputs of a respective subset of said $c$ channels for receiving parallel direct signal inputs, multiple connections to a respective subset of outputs of said register for receiving parallel feedback signal inputs and an output connected to one respective input of said register for parallel conditioning thereof to feedback shift residue states;

first means for detecting a first predetermined combinational state in said register as indication of nonoccurrence of errors in a group of $n$ signals manifested $c$ at a time in said $c$ signal channels;

second means for detecting $c$ different predetermined combinational states in said register, all different from the said first state, as indicators of error locations in respective predetermined sets of said $c$ signals manifested in said channels; and means for operating combinations of said foregoing means sequentially to provide alternatively: (a) $n-k$ check digit indications to supplement a group of $k$ raw data signals and $n-k$ terminal zero signals received through said $c$ channels and to form therewith a code word group of $n$ signals in an $(n,k)$ cyclic code or (b) error check and error correction indications specific to $n$ signals representing an $(n,k)$ code word group manifested $c$ at a time in said $c$ channels.

7. The apparatus of claim 6, wherein said $(n,k)$ code is a shortened cyclic code and said $c$ predetermined states of said register which are recognized by said second detecting means correspond to the $c$ last rows of an $n$ row by $n-k$ column autonomously produced matrix derived by design simulation of the serial polynomial division of a predetermined 1,0,0,0..... signal train representation by a predetermined generating polynomial associated with the logical organization of said $n-k$ modulo two adder circuits.

8. The apparatus of claim 6 wherein said operating means controls development of said supplemental check digit indications stated at (a) by first repeatedly operating said modulo two adder circuits to transfer sums of signals obtained in parallel from said $c$ channels and register output stages into said register while $k$ raw data signals and $n-k$ terminal zero signals are being manifested in said $c$ channels in parallel signal groups of $c$ signals, and thereafter making the residue output of said register available for further handling as supplemental check digit representations which together with said $k$ received signals form a representation of a said $(n,k)$ cyclic code word.

9. The apparatus of claim 6 wherein said $(n,k)$ code is capable of providing double error detection and single error correction.

10. The apparatus of claim 6 wherein said operating means is adapted to control development of said error check and error correction indications by:

first repeatedly operating said modulo two adder circuits to transfer into said register stages sums of said signals obtained in parallel from said respective subsets of said $c$ channels and said $n-k$ register outputs, until a total of $n$ signals representing an $(n,k)$ code word have been manifested in said $c$ channels;

immediately thereafter operating said first and second detecting means relative to said register to recognize either occurrence of said first predetermined state in said register as indication of nonoccurrence of error in said $n$ signals manifested in said $c$ channels, or conditioned upon absence of recognition of said first state, to recognize occurrence of any one of said $c$ other predetermined states as indication of a respective specific location of error within the first-manifested group of $c$ of said $n$ signals manifested in said $c$ channels;

thereafter, conditioned upon recognition of nonoccurrence of any of said $c$ predetermined states and nonoccurrence of said first predetermined state, operating said modulo two adder circuits with said $c$ channels disconnected to transfer sums of only said register feedback subcombinations into said register stages and repeating the operation of the second detecting means to recognize occurrence of any of said $c$ predetermined states in said register as indicators of specific error locations in the second-manifested group of $c$ signals previously manifested in said $c$ channels; and thereafter conditioned upon absence of recognition of any of said $c$ states repeating the operations of parallel feedback residue shifting and recognition testing, as described in the preceding paragraph, until either error is located in one of a group of $c$ of said $n$ received signals or a total of $(n/c)-1$ iterations of said operation have been performed; in the latter event said operating means being adapted to provide indication that error in uncorrectable form is present in the said $n$ manifested signals.

11. The apparatus of claim 10 including means to develop an indication of the parity of a state representation in said register, wherein said operating means is adapted to provide the control necessary for the operations of claim 11 subject to the additional condition that said parity means provide an odd parity indication coincident with the operation of said first state detecting means before any further operations are performed to develop said error location indications.

12. Device useful alternately to develop $n-k$ check signals to supplement $k$ raw data signals, and thereby form a code word in a double error detecting/single error correcting $(n,k)$ cyclic code system, while said $k$ signals are handled relative to said device in parallel signal groups of $c$ data signals $(n>c>n-k)$, and to develop error check and error locating indications for correcting errors on the fly in $n$ signals representing a code word in said $(n,k)$ cyclic code system while a raw data portion of said $n$ signals is being handled relative to the device in sequential parallel signal groups of $c$ signals, said device comprising:

a plurality of sets of $c$ lines carrying recurring signals in parallel;

a word buffer register having capacity to store at least $n$ binary signals;

a check residue register having $n-k$ binary stages;

$n-k$ modulo two adders having outputs coupled to inputs of respective stages of said check residue register for transferring $n-k$ modulo two sum function signals in parallel signal sets either to encode said signals by appendage thereto of supplemental signals developed in said residue register or to check said signals for error and conditionally correct errors therein by examination of check and location designating indications developed in said residue register;

first means for connecting $n-k$ different plural signal subcombinations of feedback signals obtained from outputs of stages of said register to inputs of respective said adders;

second means for connecting $n-k$ different subcombinations of $c$ lines from a selected one of said sets of lines to inputs of respective said adders;

third means for connecting one of said sets of lines selectively to receive outputs of one of the $c$-element sections of said word buffer register;

fourth means for connecting the $n-k$ outputs of said residue register to $n-k$ respective predetermined stages of said word buffer register;

fifth and sixth means for respectively effecting other input and output signal connections relative to said word buffer register;

first means for controlling said first, second and fourth connecting means conjointly while $k$ raw data signals are carried over one of said sets of lines to develop thereby supplemental check digit signals related to said data signals while assembling a representation of said data signals in said word buffer register and for storing said check signals together with said representation in said word buffer register as a said $(n,k)$ cyclic code word unit;

first detection means coupled to said residue register for detecting therein a first predetermined residue state condition useful to distinguish nonoccurrence of error in a checked word signal encoded in said $(n,k)$ code;

second detection means coupled to said residue register for detecting the parity condition (odd or even) of the residue state condition instantly stored in said residue register;

third detection means, coupled to said residue register and activated conditionally when said first and second detection means provide coincident indications of absence of said first predetermined residue state condition and presence of a condition of odd parity in said residue register, for providing $c$ distinct recognition indications of $c$ predetermined different residue conditions when respective said conditions are present in said register while said third detection means is coincidentally in said activated condition;

a $c$-line output bus;

seventh connecting means for transferring a said assembled word representation out of said word register to said output bus in sequential parallel signal groups of $c$ signals at a time;

first means conditioned to be operated coordinately with said seventh connecting means by error and odd parity indications obtained jointly from said first and second detection means for utilizing indications provided by said third detection means for correcting specific signal elements in said $c$ signal groups of said word representation on the fly during said transfer to said output bus;

second means conditioned to be operated coordinately with said seventh connecting means by error and odd parity indications obtained jointly from said first and second detection means, and by further indication of noncompletion of error correction obtained from said coordinately operated correcting means, for operating only said first connecting means relative to said residue register to effect modification by feedback only of the instant residue state condition thereof intermediate successive transfers of said $c$ signal groups; and third means conditioned to be operated upon completion of the transfer of a said word representation out of said register by error and odd parity indications obtained jointly from said first and second detection means, and by further indication of noncompletion of error correction obtained from said coordinately operated correcting means, for producing indication denoting presence of noncorrectable error in said transferred word.

13. Device according to claim 12 wherein $n$, $k$ and $c$ are respectively equal to 72, 64, and 18, and said code word representations are assembled in said word buffer register in four parallel transfer operations through said second connecting means and removed from said word buffer register through said connecting means in four parallel transfer operations coordinated with operations of said coordinately operated means.